(12) United States Patent
Liu et al.

(10) Patent No.: US 12,458,931 B2
(45) Date of Patent: Nov. 4, 2025

(54) METHODS FOR PREPARING MICROCAPILLARY CARBON MOLECULAR SIEVE MEMBRANES

(71) Applicant: Dow Global Technologies LLC, Midland, MI (US)

(72) Inventors: Junqiang Liu, Freeport, TX (US); Kurt A. Koppi, Midland, MI (US); Dean M. Millar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 575 days.

(21) Appl. No.: 17/788,594

(22) PCT Filed: Dec. 16, 2020

(86) PCT No.: PCT/US2020/065192
§ 371 (c)(1),
(2) Date: Jun. 23, 2022

(87) PCT Pub. No.: WO2021/133595
PCT Pub. Date: Jul. 1, 2021

(65) Prior Publication Data
US 2023/0032395 A1 Feb. 2, 2023

Related U.S. Application Data

(60) Provisional application No. 62/954,160, filed on Dec. 27, 2019.

(51) Int. Cl.
*B01D 71/02* (2006.01)
*B01D 63/06* (2006.01)
*B01D 67/00* (2006.01)

(52) U.S. Cl.
CPC ......... *B01D 71/028* (2013.01); *B01D 63/066* (2013.01); *B01D 67/0067* (2013.01); *B01D 2257/504* (2013.01); *B01D 2323/082* (2022.08)

(58) Field of Classification Search
None
See application file for complete search history.

(56) References Cited

U.S. PATENT DOCUMENTS 3,225,323 A   12/1965   Deakin
4,198,382 A    4/1980   Matsui
(Continued)

FOREIGN PATENT DOCUMENTS

CN   105921024 B   9/2016
CN   105980460 A   9/2016
(Continued)

OTHER PUBLICATIONS

Chinese Office Action dated Jan. 1, 2024, pertaining to CN Patent Application No. 202080089921.3, 12 pgs.
(Continued)

*Primary Examiner* — Peter Keyworth
(74) *Attorney, Agent, or Firm* — Dinsmore & Shohl LLP

(57) ABSTRACT

A process for preparing a microcapillary carbon molecular sieve membrane may include extruding a polyvinylidene chloride polymer to a thickness from 10 μm to 1,000 μm to form an extruded polymeric microcapillary film, wherein the extruded polymeric microcapillary film comprises a first end, a second end, and one or more microcapillaries extending from the first end to the second end; pre-treating the extruded polymeric microcapillary film at a temperature from 100° C. to 200° C. for a time from 1 hour to 48 hours to form a pre-treated polymeric microcapillary film; and pyrolizing the pre-treated polymeric microcapillary film at a temperature from 200° C. to 1,500° C. for a time from 15 minutes to 5 hours to form the microcapillary carbon molecular sieve membrane.

19 Claims, 1 Drawing Sheet

(56) References Cited

U.S. PATENT DOCUMENTS

| | | | |
|---|---|---|---|
| 4,409,284 | A | 10/1983 | Sugimo et al. |
| 4,571,317 | A | 2/1986 | Layden, Jr. et al. |
| 5,648,027 | A | 7/1997 | Tajiri et al. |
| 6,562,110 | B2 | 5/2003 | Koros et al. |
| 7,993,549 | B2 | 8/2011 | Niewöhner et al. |
| 8,911,534 | B2 | 12/2014 | Koros et al. |
| 8,999,037 | B2 | 4/2015 | Singh et al. |
| 9,527,045 | B2 | 12/2016 | Koros et al. |
| 10,239,043 | B2 | 3/2019 | Liu et al. |
| 2005/0118478 | A1* | 6/2005 | Kiefer .................. B01D 71/381 429/535 |
| 2015/0315345 | A1 | 11/2015 | Zalamea Bustillo et al. |
| 2017/0203276 | A1* | 7/2017 | Liu ....................... B01J 20/2808 |
| 2018/0161736 | A1 | 6/2018 | Coignet et al. |
| 2018/0229181 | A1 | 8/2018 | Zhang et al. |
| 2019/0076793 | A1 | 3/2019 | Liu et al. |

FOREIGN PATENT DOCUMENTS

| | | | |
|---|---|---|---|
| CN | 106794443 | A | 5/2017 |
| CN | 108697993 | A | 10/2018 |
| CN | 110035819 | A | 7/2019 |
| WO | 2016003680 | A1 | 1/2016 |

OTHER PUBLICATIONS

Communication Pursuant to Rules 161(1) and 162 EPC dated Aug. 4, 2022, pertaining to EP Patent Application No. 20829162.5, 3 pgs.
International Preliminary Report on Patentability dated Aug. 16, 2022, pertaining to Int'l Patent Application No. PCT/US2020/065192, 8 pgs.
Communication Pursuant to Rules 161(1) and 162 EPC dated Aug. 3, 2022, pertaining to EP Patent Application No. 20829285.4, 3 pgs.
International Preliminary Report on Patentability dated Aug. 10, 2022, pertaining to Int'l Patent Application No. PCT/US2020/065195, 9 pgs.
Communication Pursuant to Article 94(3) EPC, dated Feb. 1, 2024, pertaining to EP Patent Application No. 20829285.4, 10 pgs.
International Search Report and Written Opinion dated Mar. 22, 2022, pertaining to Int'l Patent Application No. PCT/US2020/065195, 12 pgs.
International Search Report and Written Opinion dated Mar. 25, 2022, pertaining to Int'l Patent Application No. PCT/US2020/065192, 10 pgs.
Xu et al. "Matrimid© derived carbon molecular sieve hollow fiber membranes for ethylene/ethane separation" Journal of Membrane Science 380 (2011) 138-147.
Rezaei et al. "Optimum structured adsorbents for gas separation processes" Chemical Engineering Science 64 (2009) 5182-5191.
Moreno-Castilla et al. "Carbon-Based Honeycomb Monoliths for Environmental Gas-Phase Applications" Materials 2010, 3, 1203-1227.
Hughes "The Carbon Fibre/Epoxy Interface—A Review" Composites Science and Technology 41 (1991) 13-45.
Xu et al. "Olefins-selective asymmetric carbon molecular sieve hollow fiber membranes for hybrid membrane-distillation processes for olefin/paraffin separations" Journal of Membrane Science 423-424 (2012) 314-323.
Bonyadi et al. "The development of novel micro-capillary film membranes" Journal of Membrane Science 389 (2012) 137-147.
Chinese Office Action dated Sep. 27, 2023, pertaining to CN Patent Application No. 202080094359.3, 16 pgs.
Chinese Office Action dated Oct. 10, 2023, pertaining to CN Patent Application No. 202080089921.3, 12 pgs.
Chinese Office Action dated May 16, 2023, pertaining to CN Patent Application No. 202080089921.3.
Brazil Technical Report dated Sep. 10, 2024, pertaining to Brazilian Patent Application No. BR112022012500.3, 8 pgs.
Brazilian Technical Report dated Nov. 28, 2024, pertaining to BR Patent Application No. BR 112022012359-0, 10 pgs.
Communication pursuant to Article 94(3) EPC, dated May 26, 2025, pertaining to European Patent Application No. 20 829 162.5, 4 pgs.
U.S. Non-Final Office Action dated Jul. 21, 2025, pertaining to U.S. Appl. No. 17/788,597, 7 pgs.

* cited by examiner

METHODS FOR PREPARING MICROCAPILLARY CARBON MOLECULAR SIEVE MEMBRANES

CROSS REFERENCE TO RELATED APPLICATIONS

This application is a national stage entry of PCT/US2020/065192 filed on Dec. 16, 2020, which claims priority to U.S. Provisional Patent Application No. 62/954,160 filed on Dec. 27, 2019, the entire disclosures of which are hereby incorporated by reference.

BACKGROUND

Field

The present specification generally relates to microcapillary carbon molecular sieve membranes for gas separation. In particular, the present specification relates to microcapillary carbon molecular sieve membranes for gas separation and methods for making microcapillary carbon molecular sieve membranes for gas separation.

Technical Background

Carbon molecular sieves (CMS) and CMS membranes have been used to separate gases. CMSs may be prepared from a variety of resins that are pyrolyzed at various temperatures and/or under various conditions. The pyrolysis reduces the resins to carbon, but maintains at least some porosity in the pyrolyzed product, in the form of micropores. The CMSs thus formed may then be employed in conventional gas separations equipment, such as packed beds, columns, and the like, where the micropore size determines which gas in a gas mixture is adsorbed or permeated and which is not. Adsorption, desorption, and permeation techniques may be alternated to carry out the separation, according to, for example, conventional pressure swing or temperature swing adsorption methods. However, preparing typical CMS membranes is often difficult as the structures may be fragile because of low carbon-epoxy (e.g., adhesive) interfacial adhesion. To ensure suitable gas separation properties, CMS membranes have typically been formed into a hollow fiber geometry to provide a large surface area. This hollow fiber geometry, however, may exacerbate the problems related to the carbon-epoxy seal because, in the hollow fiber geometry, the seal surface may be curved and the seal voids in between the fibers may be small.

Microcapillary membranes are typically embedded in films and produce a hybrid geometry that is between a flat sheet and a hollow fiber. Compared to flat sheet membranes, microcapillary membranes are self supported and provide a greater surface area per unit volume compared to flat sheet membranes.

Accordingly, a need exists for microcapillary CMS membranes and methods for making microcapillary CMS membranes for gas separation.

SUMMARY

According to one embodiment, a process for preparing a microcapillary carbon molecular sieve membrane may include extruding a polyvinylidene chloride (PVDC) polymer to a thickness from 10 μm to 1,000 μm to form an extruded polymeric microcapillary film, wherein the extruded polymeric microcapillary film comprises a first surface, a second surface, and one or more microcapillaries extending from the first surface to the second surface. The process may further include pre-treating the extruded polymeric microcapillary film at a temperature from 100° C. to 200° C. for a time from 1 hour to 48 hours to form a pre-treated polymeric microcapillary film. The process may also include pyrolizing the pre-treated polymeric microcapillary film at a temperature from 500° C. to 1,000° C. for a time from 15 minutes to 5 hours to form the microcapillary carbon molecular sieve membrane. The microcapillary carbon molecular sieve membrane wall may contain micropores having an average micropore size from 3 Å to 5 Å defined by molecular cutoff method. The one or more microcapillaries may each have a diameter from 5 μm to 500 μm.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
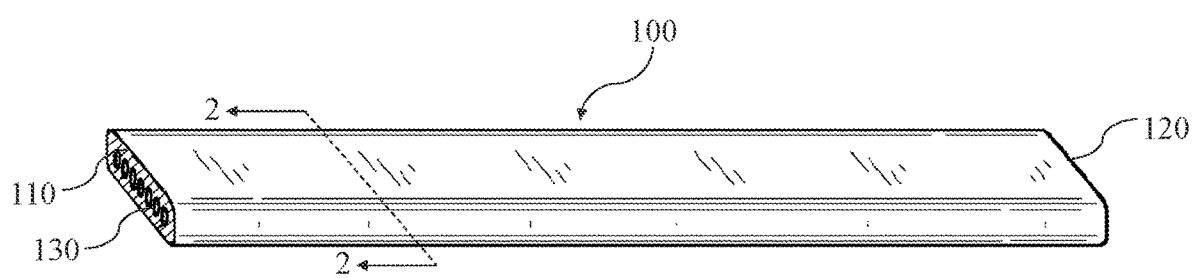
FIG. 1 illustrates a perspective view of a microcapillary CMS membrane produced according to one or more embodiments described herein.

Reference will now be made in detail to embodiments of microcapillary CMS membranes and processes for making microcapillary CMS membranes, embodiments of which are illustrated in the accompanying drawings. Whenever possible, the same reference numerals will be used throughout the drawings to refer to the same or like parts.

Traditional microcapillary membranes may provide improved gas throughput than conventional CMS structures. However, these microcapillary structures have not yet been included with extruded CMS structures. Therefore, in order to overcome the problems associated with typical microcapillary membranes, the present disclosure contemplates forming microcapillary CMS membranes. The microcapillary CMS membranes disclosed herein (a) are able to be extruded into various microcapillary articles; (b) retain its microcapillaries during pyrolysis; and (c) form permselective CMS membranes capable of gas separation without the problems associated with the fragility of the typical CMSs described hereinabove.

In one embodiment, a process for preparing a microcapillary carbon molecular sieve membrane may include extruding a polyvinylidene chloride (PVDC) polymer to a thickness from 10 μm to 1,000 μm to form an extruded polymeric microcapillary film, wherein the extruded polymeric microcapillary film comprises a first surface, a second surface, and one or more microcapillaries extending from the first surface to the second surface; pre-treating the extruded polymeric microcapillary film at a temperature from 100° C. to 200° C. for a time from 1 hour to 48 hours to form a pre-treated polymeric microcapillary film; and pyrolizing the pre-treated polymeric microcapillary film at a temperature from 500° C. to 1,000° C. for a time from 15 minutes to 5 hours to form the microcapillary carbon molecular sieve membrane. The microcapillary carbon molecular sieve membrane wall may contain one or more micropores having an average micropore size from 3 Å to 5 Å defined by the molecular cutoff method, and the one or more microcapillaries may each have a diameter from 5 μm to 500 μm. Microcapillary CMS membranes according to embodiments and methods for preparing microcapillary CMS membranes according to embodiments will now be described with reference to the appended drawings.

Figure 2:
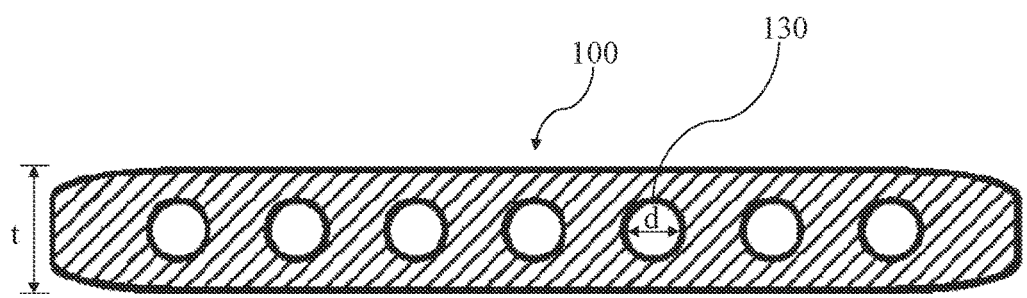
FIG. 2 illustrates a cross-sectional view of a microcapillary CMS membrane produced according to one or more embodiments described herein.

With reference now to FIGS. 1 and 2, a microcapillary CMS membrane 100 according to embodiments may include a first end 110 and a second end 120 opposite of the first end 110. The microcapillary CMS membrane 100 comprises microcapillaries 130 that extend from the first end 110 of the microcapillary CMS membrane 100 to the second end 120 of the microcapillary CMS membrane 100. In embodiments, and as shown in FIG. 1, the microcapillaries 130 of the microcapillary CMS membrane 100 provide central conduits running from the first end 110 of the microcapillary CMS membrane 100 to second end 120 of the microcapillary CMS membrane. It should be understood that not all microcapillaries 130 of the of the microcapillary CMS membrane 100 are labeled in FIG. 1 and FIG. 2. In general, the microcapillary CMS membrane 100 may be incorporated into various systems for gas separations. Such gas separations may include the following pairs of gases wherein at least one molecule, and in some embodiments both molecules, has a representative molecular diameter falling from 3 Å to 5 Å: propylene ($C_3H_6$) and propane ($C_3H_8$); carbon dioxide ($CO_2$) and nitrogen ($N_2$); $N_2$ and methane ($CH_4$); ethylene ($C_2H_4$) and ethane ($C_2H_6$); or n-butane (n-$C_4H_{10}$) and iso-butane (i-$C_4H_{10}$). The microcapillary CMS membrane 100 may also be incorporated in the formation of pellets, films, fibers, monoliths, or sheets such as woven sheets, and in certain particular embodiments may be incorporated in packed beds or other typical gas separation systems, and particularly in gas separations systems based upon, for example, pressure or temperature swing principles.

The microcapillary CMS membrane 100 may be formed from a polyvinylidene chloride (PVDC) polymer, comprising a vinylidene chloride monomer. In embodiments, the PVDC may be copolymerized with at least one additional comonomer. The comonomer may be selected from a variety of materials, such as a vinyl monomer, vinyl chloride monomer, an acrylate monomer, a methacrylate monomer, a styrenic monomer, acrylonitrile, methacrylonitrile, itaconic acid, chlorotrifluoroethylene, polyimide, or combinations thereof.

In proportion, the PVDC polymer of the microcapillary CMS membrane 100 may include at least 50 percent by weight (wt %) of vinylidene chloride, based on total weight of the copolymer, such as at least 55 wt %, 60 wt %, 65 wt %, 70 wt %, 75 wt %, 80 wt %, 85 wt %, 90 wt %, 95 wt %, or 97 wt %. In one or more embodiments, the PVDC polymer may include a maximum of 99.9 wt % of vinylidene chloride, such as 99.5 wt %, 99 wt %, 98 wt %, 97 wt %, 95 wt %, or 90 wt %. In such embodiments, the PVDC polymer may include a minimum of at least 0.1 wt % of the at least one comonomer, such as from 0.1 wt % to 10 wt %, from 0.5 wt % to 5 wt %, or from 1 wt % to 2 wt %.

In embodiments, the microcapillary CMS membrane 100 may further include one or more additives. Additives may include, but are not limited to, epoxidized oil stabilizers, such as expoxidized soybean oil, expodized linseed oil, and the diglycidyl ether of bisphenol A. Additives may further include liquid plasticizers, such as aliphatic and aromatic esters, including for example dibutyl sebacate, acetyl tributyl citrate, dioctyl phthalate, and the like, and combinations thereof. Additional additives that may be incorporated into the microcapillary CMS membrane 100 may include lubricants (e.g., high-density polyethylene, acrylate copolymers and silicone polymers), such as polyethylene wax, paraffin wax, oxidized polyethylene wax, and combinations thereof. Suitable additives may also include acid scavengers, such as epoxy compounds, magnesium hydroxide, magnesium oxide, tetrasodium pyrophosphate, calcium phosphate, magnesium phosphate, synthetic hydrotalcite-like halogen scavengers, calcium oxide, calcium carbonate, or combinations thereof. Antioxidants such as phenolics may also be incorporated as an additive. Combinations of any or all of these additives may be included in the PVDC.

In embodiments of the microcapillary CMS membrane 100 that include additives, the maximum amount of all additives present in the microcapillary CMS membrane 100 may be 10 wt %, such as 9 wt %, 8 wt %, 7 wt %, 6 wt %, 5 wt %, 4 wt %, 3 wt %, 2 wt %, or 1 wt %. Likewise, in embodiments that include additives, the minimum amount of all additives present in the microcapillary CMS 100 membrane may be 0.0001 wt %, such as 0.001 wt %, 0.01 wt %, 0.1 wt %, or 0.5 wt %, or 1 wt %.

Referring to FIG. 2, the microcapillary CMS membrane 100, in embodiments, may have a thickness t from 10 microns (μm) to 1,000 μm, such as from 10 μm to 900 μm, from 10 μm to 800 μm, from 10 μm to 750 μm, from 10 μm to 700 μm, from 10 μm to 600 μm, from 10 μm to 500 μm, from 10 μm to 400 μm, from 10 μm to 300 μm, from 10 μm to 250 μm, from 10 μm to 200 μm, from 20 μm to 1,000 μm, from 20 μm to 900 μm, from 20 μm to 800 μm, from 20 μm to 750 μm, from 20 μm to 700 μm, from 20 μm to 600 μm, from 20 μm to 500 μm, from 20 μm to 400 μm, from 20 μm to 300 μm, from 20 μm to 250 μm, from 20 μm to 200 μm, from 30 μm to 1,000 μm, from 30 μm to 900 μm, from 30 μm to 800 μm, from 30 μm to 750 μm, from 30μm to 700 μm, from 30 μm to 600 μm, from 30 μm to 500 μm, from 30 μm to 400 μm, from 30 μm to 300 μm, from 30 μm to 250 μm, or from 30 μm to 200 μm.

Again referring to FIG. 2, the microcapillaries 130 of the microcapillary CMS membrane 100 may have a diameter d from 1 μm to 500 μm, such as from 1 μm to 450 μm, from 1 μm to 400 μm, from 1 μm to 350 μm, from 1 μm to 300 μm, from 1 μm to 250 μm, from 1 μm to 200 μm, from 1 μm to 150 μm, from 1 μm to 100 μm, from 1 μm to 50 μm, from 1 μm to 25 μm, from 1 μm to 10 μm, from 1 μm to 5 μm, 5 μm to 500 μm, such as from 5 μm to 450 μm, from 5 μm to 400 μm, from 5 μm to 350 μm, from 5 μm to 300 μm, from 5 μm to 250 μm, from 5 μm to 200 μm, from 5 μm to 150 μm, from 5 μm to 100 μm, from 5 μm to 50 μm, from 5 μm to 25 μm, from 5 μm to 10 μm, 10 μm to 500 μm, such as from 10 μm to 450 μm, from 10 μm to 400 μm, from 10 μm to 350 μm, from 10 μm to 300 μm, from 10 μm to 250 μm, from 10 μm to 200 μm, from 10 μm to 150 μm, from 10 μm to 100 μm, from 10 μm to 50 μm, from 10 μm to 25 μm, or from 10 μm to 20 μm. In embodiments, the microcapillaries 130 may each have substantially identical diameters.

In embodiments, each microcapillary 130 may be placed at least 1 μm apart from each other, such as at least 2 μm apart from each other, at least 3 μm apart from each other, at least 4 μm apart from each other, at least 5 μm apart from each other, or at least 10 μm apart from each other. Each microcapillary 130, in one or more embodiments and as shown in FIG. 2, may be positioned substantially equidistant to the other microcapillaries 130 present in the microcapillary CMS membrane 100. However, in embodiments, the microcapillaries 130 may be variably positioned within the microcapillary CMS membrane 100. If the microcapillaries are too close together, the strength of the microcapillary CMS membrane may be compromised, but if the microcapillaries are too far apart, the quantity of gas that can be separated will decrease.

In embodiments, and as shown in FIGS. 1 and 2, the microcapillaries 130 of the microcapillary CMS membrane 100 may have a circular cross-sectional shape. In one or more embodiments, the microcapillaries 130 may have a rectangular cross-sectional shape, an oval cross-sectional shape, a star cross-sectional shape, a diamond cross-sectional shape, a triangular cross-sectional shape, a square cross-sectional shape, or combinations of these cross-sectional shapes. However, it should be understood that the geometry of the cross-sectional shape is not limited and that combinations of cross-sectional shapes can be used.

In one or more embodiments, the microcapillaries 130 of a microcapillary CMS membrane 100 may be formed by the flow of a fluid in a microcapillary die. Fluids that may be used, according to embodiments, to form the microcapillaries 130 in the microcapillary CMS membrane 100 include ambient air, one or more gases, one or more liquids, or one of more thermoplastic materials, and combinations thereof. Suitable microcapillary fluid gases may include oxygen, nitrogen, carbon dioxide, argon, helium, or combinations thereof. Exemplary microcapillary fluid liquids may include mineral oils, silicone oils, vegetable oils, or combinations thereof. Suitable microcapillary fluid thermoplastic materials may include homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polyvinylidene fluoride, polymethyl acrylate, and polymethyl methacrylate; polyamides such as nylon 6, nylon 6,6, and nylon 12; thermoplastic polyesters such as polyethylene terephthalate and polybutylene terephthalate; polyurethane; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. When non-gaseous fluids are used to form the microcapillaries 130, these non-gaseous fluids are removed from the microcapillary CMS membrane 100. Methods for removing the non-gaseous fluids may, according to embodiments, include displacing the non-gaseous fluid by a flowing gas, washing the non-gaseous fluid out with a cleaning fluid, dissolving the non-gaseous fluid in a solvent, burning out the non-gaseous fluid during a pyrolysis step, or a combination thereof.

The microcapillary CMS membrane 100 may be formed by a process that includes extruding a polyvinylidene chloride (PVDC) polymer to a thickness from 10 μm to 1,000 μm to form an extruded polymeric microcapillary film, wherein the extruded polymeric microcapillary film comprises a first end 110, a second end 120, and one or more microcapillaries 130 extending from the first end 110 to the second end 120. The extruding step may include melting the PVDC polymer and extruding the PVDC polymer through an extruder (e.g., a single-screw extruder, a twin-screw extruder, or the like) and a microcapillary film die to form the extruded polymeric microcapillary film. In embodiments, the extruding step may be performed at a temperature from 125° C. to 225° C., such as from 125° C. to 200° C., from 125° C. to 175° C., or at about 150° C. Conventional methods other than extruding may also be used to form microcapillary CMS membranes 100.

In embodiments, the extruded polymeric microcapillary film may have a crystallinity from 25% to 75%, such as 30% to 55% or 35% to 50%, as measured by differential scanning calorimetry (DSC) according to ASTM D3418. While discussion of the significance of the crystallinity of the extruded polymeric microcapillary film, which serves as a precursor to the microcapillary CMS membrane 100, is set forth in greater detail below, it is noted that ensuring the crystallinity within the designated range is a key to obtaining the desired average micropore size and average micropore volume, following the pyrolysis, in the final microcapillary CMS membrane 100. As such, it is noted that inclusion of a comonomer may reduce precursor crystallinity to ensure the desired range, and also to reduce the melt temperature and thereby improve processability of the resulting extruded polymeric microcapillary film. In general, inclusion of bulkier monomers may tend to reduce overall copolymer crystallinity by a greater amount than inclusion of less bulky monomers. Thus, for example, butyl acrylate may tend to reduce crystallinity more than, for example, methyl acrylate or ethyl acrylate, assuming that the additives used in the same mole percent (mol %) based on final extruded polymeric microcapillary film composition.

The process for forming the microcapillary CMS membrane 100 may further include pre-treating the extruded polymeric microcapillary film to form a pre-treated polymeric microcapillary film. The pre-treating may be performed at a temperature from 100° C. to 200° C., such as from 100° C. to 180° C., from 120° C. to 160° C., or from 130° C. to 150° C. In embodiments, the temperature during the pre-treatment process may be increased until a target temperature is reached. For example, the temperature may be increased by 1° C./min for at least 15 minutes until the final temperature during the pre-treating step is reached.

The pre-treatment step may stabilize (e.g., lock) the structure of the pre-treated polymeric microcapillary film prior to its carbonization (via pyrolysis). In the pre-treating step, the extruded polymeric microcapillary film may be heated, below its melting temperature (typically less than about 200° C., depending upon its exact composition of the precursor), to dehydrochlorinate the extruded polymeric microcapillary film by at least 10%. In other words, during the pre-treating step, hydrogen chloride may be removed from the extruded polymeric microcapillary to a point at which the extruded polymeric microcapillary film no longer melts and, in fact, becomes infusible. It is well known in the art that such a change in molecular kinetics begins to occur at a point of approximately 10% dehydrochlorination and is completed or maintained as the level of dehydrochlorination increases above that point. As such, this step is termed a "pre-treatment" because it occurs prior to a pyrolysis step, which is the step in which carbonization of the pre-treated polymeric microcapillary film is accomplished.

In embodiments, the pre-treatment step may be performed in air, but other atmospheres, such as $N_2$ and other inert gases or oxidizing gases such as $CO_2$, or combinations thereof, may also or alternatively be used, since generally only minor levels of oxidation of the extruded polymeric microcapillary film are anticipated within the overall given temperature range. Achievement of the desired dehydrochlorination may be accelerated by subjecting the extruded polymeric microcapillary film to a source of high energy irradiation, such as gamma rays, an electron beam, ultraviolet light, or combinations thereof during the pre-treatment step.

The pre-treatment time may vary from 1 hour to 48 hours, such as from 1 hour to 36 hours, from 1 hour to 24 hours, from 1 hour to 12 hours, from 2 hours to 12 hours, from 6 hours to 12 hours, or from 8 hours to 12 hours so long as the pre-treated polymeric microcapillary film reaches the at least 10% dehydrochlorination point. The dehydrochlorination degree can vary from 10% to 100%, depending upon pre-treatment temperature and time. While it is desirable that substantially all of the copolymer be dehydrochlorinated to the desired extent, it is recognized that presence of a minor amount, desirably less than 2 wt %, of precursor that is not at least 10% dehydrochlorinated may be acceptable. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

To prepare the extruded polymeric microcapillary film for the pre-treating step, the extruded polymeric microcapillary film may be placed between two or more ceramic plates before the extruded polymeric microcapillary film is subjected to heating in an oven. The ceramic plates may have a honeycomb shape to facilitate the diffusion of hydrogen chloride (HCl) gas released from the extruded polymeric microcapillary film during the pre-treating step. The ceramic plates may each weigh about 100 grams. Anti-adhesive material, such as cellulose filter paper, may be placed between the extruded polymeric microcapillary film and each ceramic plate in order to prevent the extruded polymeric microcapillary film from sticking to the ceramic plates.

The process for preparing the microcapillary CMS membrane 100 further includes pyrolizing the pre-treated polymeric microcapillary film. In embodiments, the pyrolizing step may result in at least 90 wt % of the pre-treated polymeric microcapillary film becoming carbonized, such as least 95 wt % or 99 wt % of the pre-treated polymeric microcapillary film becoming carbonized. The pyrolysis that occurs during the pyrolizing step may also be termed "carbonization" because the result thereof is that the treated polymeric microcapillary film may be converted to the carbon-only, or near carbon-only, skeleton of its extruded polymeric microcapillary film structure. As such, substantially all atoms other than carbon have been removed from the polymeric microcapillary film, but the carbon-carbon bonds remain substantially intact. Thus, the microcapillary CMS membrane 100 that has formed during the pyrolizing step may be deemed "carbonaceous."

The pyrolizing step, in embodiments, may be performed at a temperature from 200° C. to 1,500° C., such as from 250° C. to 1,400° C., from 300° C. to 1,300° C., from 350° C. to 1,200° C., from 400° C. to 1,000° C., from 450° C. to 975° C., from 475° C. to 975° C., or from 500° C. to 900° C. Likewise, the pyrolysis step may be performed for a time from 15 minutes to 5 hours, such as from 30 minutes to 4 hours, from 45 minutes to 3 hours, from 1 hour to 3 hours, or from 2 hours to 3 hours. In embodiments, the temperature during the pyrolysis step may be increased until a target temperature is reached. For example, the temperature may be increased by 3° C./min for at least 15 minutes until the final temperature during the pyrolysis step is reached. Without being bound by theory, it is believed that the temperature of the pyrolizing step may be inversely proportional to the diameters of the micropores formed in the microcapillary CMS membrane.

In embodiments, the pyrolysis step may be performed in nitrogen, but other atmospheres, such as argon and other inert gases or mildly oxidizing gases, such as $CO_2$, or combinations thereof, may also or alternatively be used. In one or more embodiments, the pre-treated polymeric microcapillary film may be pyrolyzed in an environment that may be continually purged with $N_2$. The $N_2$ may be introduced to the environment from 2.5 liters per minute (L/min) to 7.5 L/min in order to ensure that the environment is sufficiently reduced during the pyrolysis step.

In one or more embodiments, the pyrolizing step may include placing the extruded polymeric microcapillary film, which was already placed between ceramic plates during the pre-treating step, and passing the extruded polymeric microcapillary film into an oven. Similar to the arrangement during the pre-treating step, anti-adhesive material, such as cellulose filter paper, may be between the extruded polymeric microcapillary film and each ceramic plate in order to prevent the extruded polymeric microcapillary film from sticking to the ceramic plates during pyrolysis.

A distinct result of the presently described process is that an average micropore size, from 3 Å to 5 Å, may be preselected according to a desired gas separation utility. Pre-selection of the desired average micropore size may then be correlated with a known or preselected precursor crystallinity of the extruded polymeric microcapillary film and an attained maximum pyrolysis temperature in order to obtain a microcapillary CMS membrane 100 having the desired average micropore size.

EXAMPLES

Embodiments will be further clarified by the following examples.

Example 1

Microcapillary films with a thickness of about 500 μm were melt extruded from SARAN® 946, a PVDC copolymer manufactured by SK Global SARAN (Seoul, Korea), using a single-screw extruder with three zones and a microcapillary film die. The three zones of the extruder were all set at temperatures from 155° C. to 170° C. A microcapillary film die was made of a slit die with insert containing 42 parallel needles to introduce air and form microcapillaries. The extruder rate (~45 g/min) and the air flow rate (100 sccm) were adjusted to achieve the desired film thickness (~0.5 mm) and microcapillary diameter (0.315 mm). The microcapillary films were then quenched in a water bath and sent to a rotating drum for drying. The microcapillary were then cut into approximately 3-foot long strips and laid out in atmospheric conditions to fully crystallize for about one week.

The microcapillary films were then cut into approximately 8-centimeter strips and subjected to pre-treating and pyrolysis. The pre-treating included placing an 8-centimeter microcapillary film strip between filter paper (Whatman™ 1003-125 cellulose filter paper) and then placing the filter paper-film stack between porous ceramic plates, each ceramic plate weighing about 100 grams. The stack comprising the microcapillary film, the filter paper, and the ceramic plates were then placed in an oven that has been purged with air at a flow rate of 2 liters per minute (L/min). The temperature of the oven was gradually raised to 130° C. at a temperature ramp of 1° C./min and held at 130° C. for 12 hours. The stack comprising the microcapillary film, the filter paper, and the ceramic plates were then removed from the oven and allowed to cool to 60° C. under atmospheric conditions.

The pre-treated microcapillary film, still in the stacked configuration, was then placed into a quartz tube furnace having a diameter of 6 inches by 24 inches for pyrolyzing. The oven was purged using nitrogen ($N_2$) at a flow rate of 5 L/min. The furnace was then raised to a final temperature at a temperature ramp of 3° C./min and held at the final temperature for 120 minutes. A first batch of pre-treated microcapillary film was pyrolyzed at a final temperature of 550° C. and a second batch of pre-treated microcapillary film was pyrolyzed at a final temperature of 925° C. Each of the two batches (e.g., the microcapillary CMS membranes) were then cooled to about 60° C. in atmospheric conditions before mixed gas permeation and selectivity testing.

Each of the microcapillary CMS membranes were subjected to one of the following gas mixtures to test for mixed gas permeance: (1) 20 mol % $CO_2$ and 80 mol % $N_2$; (2) 50 mol % $C_3H_6$ and 50 mol % $C_3H_8$; or (3) 50 mol % n-$C_4H_{10}$ and 50 mol % i-$C_4H_{10}$. The flow rate for each of the gas mixtures was 50 standard cubic centimeters per minute (sccm) at a pressure of 1 atmosphere (atm). The gas mixtures were continuously purged downstream with argon stream at a flow rate of 25 sccm at a pressure of 1 atm. Permeation tests (1) and (2) were performed at a temperature of 35° C. and permeation test (3) was performed at a temperature of 20° C. The downstream purge was collected and analyzed by a gas chromatogram (GC). The $CO_2$ and $N_2$ concentrations were measured using a thermal conductivity detector (TCD) while the hydrocarbon concentrations were measured using a flame ionization detector (FID). The permeate flux was calculated using the argon flow rate and permeate gas concentrations as measured by the GC. The permeability was calculated using the permeate flux, normalized by the microcapillary CMS membrane surface area.

The permeance and selectivities of the two batches of microcapillary CMS membranes is shown in Table 1, below. As can be seen Table 1, the microcapillary CMS membrane pyrolyzed at 550° C. indicates a much larger permeance of n-$C_4H_{10}$ and i-$C_4H_{10}$ when compared to the microcapillary CMS membrane pyrolyzed at 925° C. This difference suggests that the micropore size of the microcapillary CMS membrane pyrolyzed at 550° C. is greater than the kinetic diameter of n-$C_4H_{10}$ and i-$C_4H_{10}$ (e.g., greater than 5 Å) while the micropore size of the microcapillary CMS membrane pyrolyzed at 925° C. is smaller than the kinetic diameter of n-$C_4H_{10}$ and i-$C_4H_{10}$ (e.g., smaller than 5 Å). By controlling the pyrolysis temperature, the micropore size can be tuned to suit for separations of various gas pairs with different molecular sizes. Moreover, the high selectivity of $CO_2$/i-$C_4H_{10}$ for both Batch 1 and Batch 2 suggest that the microcapillary CMS membrane is useful for separating molecules having diameters from 3 Å to 5 Å.

TABLE 1

Mixed Gas Permeation Results of the Microcapillary CMS Membranes

| Gas permeance and selectivity | Microcapillary CMS Membrane of Batch 1 | Microcapillary CMS Membrane of Batch 2 |
| --- | --- | --- |
| $CO_2$ [GPU] | 71.3 | 21.8 |
| $N_2$ [GPU] | 10.1 | 2.0 |
| $C_3H_6$ [GPU] | 17.9 | 1.8 |
| $C_3H_8$ [GPU] | 13.0 | 0.8 |
| n-$C_4H_{10}$ [GPU] | 7.0 | 0.18 |
| i-$C_4H_{10}$ [GPU] | 6.4 | 0.06 |
| $CO_2/N_2$ [—] | 7.1 | 10.9 |
| $CO_2$/i-$C_4H_{10}$ [—] | 11.2 | 348.6 |

GPU is Gas Permeation Unit, 1 GPU = $10^{-6}$ cm$^3$(STP)/(cm$^2$ s cm Hg)

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A process for preparing a microcapillary carbon molecular sieve membrane, the process comprising:
   extruding a polyvinylidene chloride (PVDC) polymer to a thickness from 10 μm to 1,000 μm to form an extruded polymeric microcapillary film, wherein the extruded polymeric microcapillary film comprises a first end, a second end, and two or more microcapillaries extending from the first end to the second end;
   pre-treating the extruded polymeric microcapillary film at a temperature from 100° C. to 200° C. for a time from 1 hour to 48 hours to form a pre-treated polymeric microcapillary film; and pyrolizing the pre-treated polymeric microcapillary film at a temperature from 200° C. to 1,500° C. for a time from 15 minutes to 5 hours to form the microcapillary carbon molecular sieve membrane, wherein
the microcapillary carbon molecular sieve membrane comprises micropores having an average micropore size from 3 Å to 5 Å, and
the one or more microcapillaries each have a diameter from 1 μm to 500 μm.

2. The process of claim 1, wherein the extruding step comprises melting the PVDC polymer and extruding the PVDC polymer through a single-screw extruder and a microcapillary film die to form the extruded polymeric microcapillary film.

3. The process of claim 1, wherein the extruding step is performed at a temperature from 125° C. to 225° C.

4. The process of any one of claim 1, wherein the pre-treating step comprises placing the extruded polymeric microcapillary film between ceramic plates and inserting the extruded polymeric microcapillary film into an oven.

5. The process of claim 4, further comprising placing a layer of anti-adhesive material between the extruded polymeric microcapillary film and the ceramic plates.

6. The process of claim 1, further comprising increasing the temperature during the pre-treating step by at least 1° C./min for at least 15 minutes.

7. The process of claim 1, wherein the pre-treating step further comprises subjecting the extruded polymeric microcapillary film to gamma beam irradiation, electron beam irradiation, UV irradiation, or combinations thereof.

8. The process of claim 1, wherein the pyrolizing step comprises placing the extruded polymeric microcapillary film between ceramic plates and passing the extruded polymeric microcapillary film into an oven.

9. The process of claim 8, further comprising placing a layer of anti-adhesive material between the extruded polymeric microcapillary film and the ceramic plates.

10. The process of claim 1, wherein the pyrolizing step is performed at a temperature from 500° C. to 900° C.

11. The process of claim 1, further comprising increasing the temperature during the pyrolizing step by at least 3° C./min for at least 15 minutes.

12. The process of claim 1, wherein the pyrolizing step is performed in a reduced environment, in which the environment is continually purged with nitrogen from 2.5 L/min to 7.5 L/min.

13. The process of claim 1, wherein the temperature of the pyrolizing step is inversely proportional to the average micropore sizes in the microcapillary film wall.

14. The process of claim 1, wherein the one or more microcapillaries each comprise a microcapillary fluid.

15. The process of claim 14, wherein the microcapillary fluid comprises oxygen, nitrogen, carbon dioxide, argon, helium, or combinations thereof.

16. The process of claim 1, wherein the microcapillary carbon molecular sieve membrane is a sheet membrane.

17. The process of claim 1, wherein:
the microcapillary carbon molecular sieve membrane has a flat shape; and
the first end and the second end each have a generally rectangular shape.

18. A process for preparing a microcapillary carbon molecular sieve membrane, the process comprising:
extruding a polyvinylidene chloride (PVDC) polymer to a thickness from 10 μm to 1,000 μm to form an extruded polymeric microcapillary film, wherein the extruded polymeric microcapillary film comprises a first end, a second end, and one or more microcapillaries extending from the first end to the second end;
pre-treating the extruded polymeric microcapillary film at a temperature from 100° C. to 200° C. for a time from 1 hour to 48 hours to form a pre-treated polymeric microcapillary film; and
pyrolizing the pre-treated polymeric microcapillary film at a temperature from 200° C. to 1,500° C. for a time from 15 minutes to 5 hours to form the microcapillary carbon molecular sieve membrane, wherein
the microcapillary carbon molecular sieve membrane comprises micropores having an average micropore size from 3 Å to 5 Å,
the one or more microcapillaries each have a diameter from 1 μm to 500 μm, and
the microcapillary carbon molecular sieve membrane is a sheet membrane.

19. A process for preparing a microcapillary carbon molecular sieve membrane, the process comprising:
extruding a polyvinylidene chloride (PVDC) polymer to a thickness from 10 μm to 1,000 μm to form an extruded polymeric microcapillary film, wherein the extruded polymeric microcapillary film comprises a first end having a generally rectangular shape, a second end having a generally rectangular shape, and one or more microcapillaries extending from the first end to the second end;
pre-treating the extruded polymeric microcapillary film at a temperature from 100° C. to 200° C. for a time from 1 hour to 48 hours to form a pre-treated polymeric microcapillary film; and
pyrolizing the pre-treated polymeric microcapillary film at a temperature from 200° C. to 1,500° C. for a time from 15 minutes to 5 hours to form the microcapillary carbon molecular sieve membrane having a flat shape, wherein
the microcapillary carbon molecular sieve membrane comprises micropores having an average micropore size from 3 Å to 5 Å, and
the one or more microcapillaries each have a diameter from 1 μm to 500 μm.

* * * * *